United States Patent [19]

Bergh et al.

[11] Patent Number: 4,479,737
[45] Date of Patent: Oct. 30, 1984

[54] POSITIVE INTERLOCK

[75] Inventors: George G. Bergh; Robert G. Bergh, both of Plainville, Mass.

[73] Assignee: Bergh Bros. Co., Inc., Attleboro Falls, Mass.

[21] Appl. No.: 534,330

[22] Filed: Sep. 21, 1983

Related U.S. Application Data

[63] Continuation of Ser. No. 344,822, Feb. 1, 1982, abandoned.

[51] Int. Cl.³ .............................................. E04C 2/38
[52] U.S. Cl. ..................................... 403/382; 52/658; 220/76; 403/401
[58] Field of Search ........................... 220/76; 52/658; 403/401, 402, 382, 403; 24/23 W, 23 EE, 20 EE

[56] References Cited

U.S. PATENT DOCUMENTS

| | | | |
|---|---|---|---|
| 1,746,429 | 2/1930 | Kelleweay | 24/20 EE X |
| 2,869,694 | 1/1959 | Breckheimer | 52/658 |
| 3,065,451 | 11/1962 | Rutter | 24/230 R X |
| 3,967,351 | 7/1976 | Rosenberg et al. | 24/230 |
| 4,084,720 | 4/1978 | Thurston | 52/658 X |

Primary Examiner—Allan N. Shoap
Attorney, Agent, or Firm—Thompson, Birch, Gauthier & Samuels

[57] ABSTRACT

Apparatus for interlocking the ends of first and second channel-shaped wall sections, comprising a substantially perpendicular first tongue integral with and extending inwardly from the end of the first wall section, with a slot at the juncture therebetween. A substantially perpendicular second tongue is integral with and extends inwardly from the second wall section. The second tongue is dimensioned for insertion through the aforesaid slot, and it has a detent arranged to cooperate in mechanical engagement with the first tongue, as long as the second tongue is operatively positioned beneath and in parallel relationship to the first wall section. A third tongue on the first wall section holds the second tongue in its operative position.

3 Claims, 8 Drawing Figures

U.S. Patent  Oct. 30, 1984  Sheet 1 of 2  4,479,737
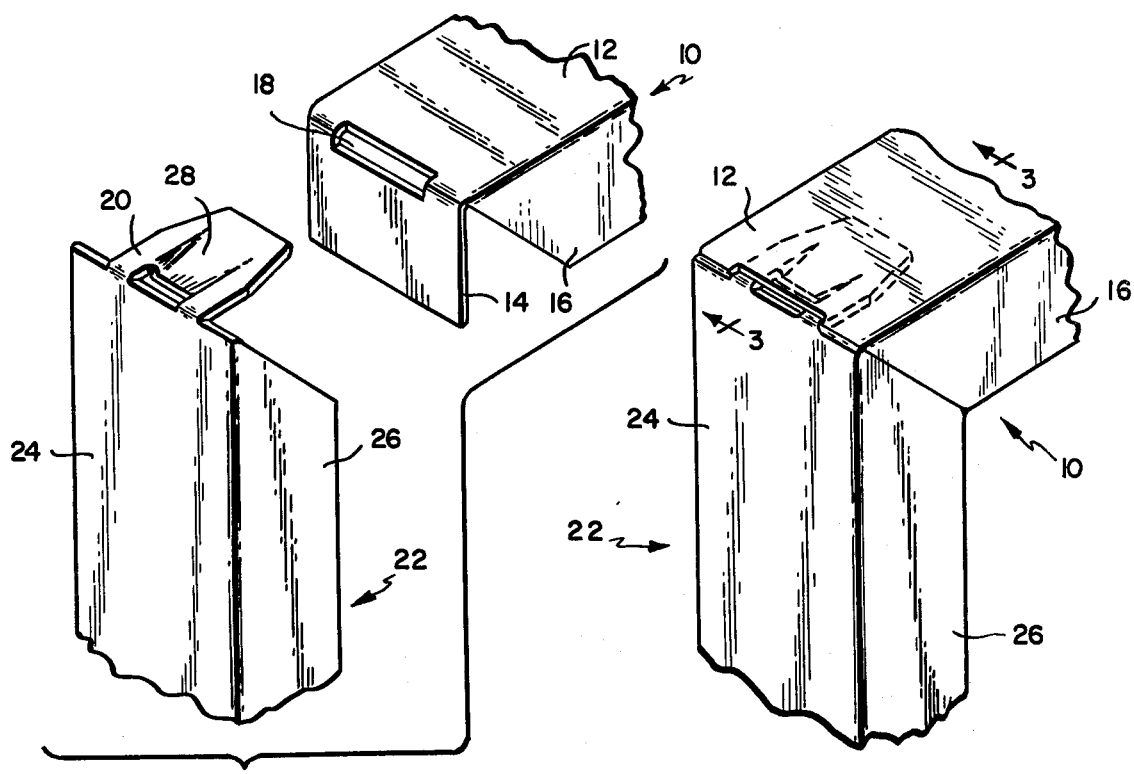
FIG.1 (PRIOR ART)
FIG.2 (PRIOR ART)
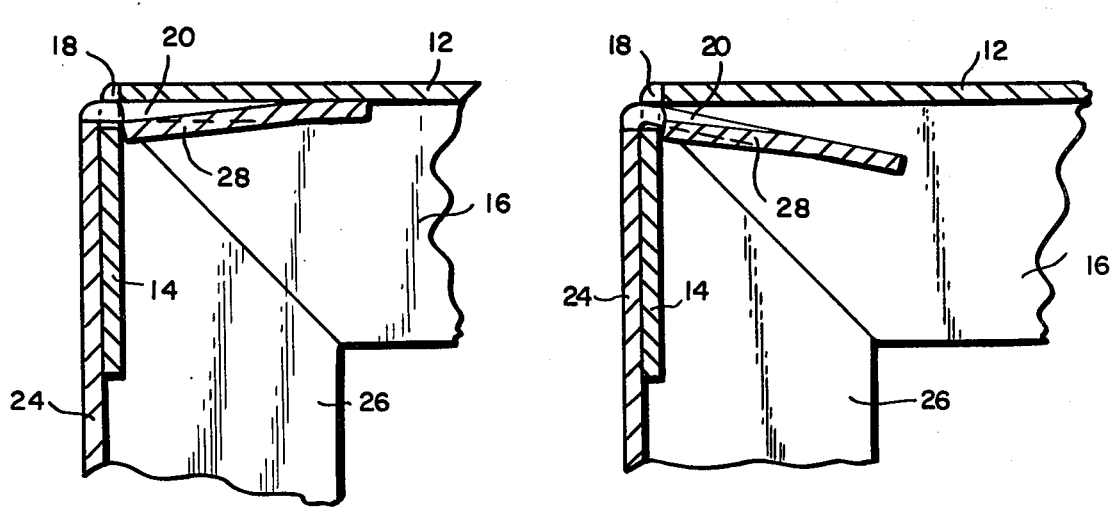
FIG.3 (PRIOR ART)
FIG.4 (PRIOR ART)

POSITIVE INTERLOCK

This application is a continuation of application Ser. No. 344,822, filed Feb. 1, 1982, now abandoned.

BACKGROUND OF THE INVENTION

1. Field of the invention

This invention relates to metal wall components of the type employed in boxes, frames and the like, and is concerned in particular with an improved arrangement for positively and mechanically interlocking the ends of adjacent sections of such wall components.

2. Description of the prior art

The above-mentioned metal wall components are employed in picture or display frames of the type shown in U.S. Pat. Nos. 4,170,080; 3,849,917 and 3,340,638; and in boxes of the type shown in U.S. Pat. Nos. 4,099,64; 3,741,430; 3,675,842 and 3,553,822. Such wall components are conventionally channel-shaped metal stampings fabricated in single continuous lengths. The inturned side flanges are appropriately notched to accommodate corner bends, and the ends of the components are mechanically interlocked by inserting a tongue on one end into a slot at the other end, with the tongue being provided with a detent arranged to prevent subsequent tongue withdrawal. This prior art arrangement is disclosed in FIGS. 1-4, where it will be seen that a first wall section 10 has a first planar wall 12 with an integral substantially perpendicular first tongue 14 extending inwardly therefrom. Parallel inwardly directed flanges 16 extend along the sides of wall 12 to provide a channel shaped cross section. A slot 18 is located at the juncture of the tongue 14 and wall 12. A substantially perpendicular second tongue 20 extends inwardly and integrally from the end of a second wall section 22, also having a planar wall 24 and side flanges 26. The tongue 20 is dimensioned for insertion through the slot 18 and is provided with a detent 28. As can be best seen in FIG. 3, in the ideal situation when the tongue 20 is inserted fully through the slot 18 to an operative position underlying and in parallel relationship with the wal 12, the detent 28 snaps behind tongue 14, thus providing a positive interlock.

However, as shown in FIG. 4, it sometimes happens that the tongue 20 is bent inwardly at an acute angle relative to wall 24. This can occur through inadvertence prior to or during assembly, or it can occur after assembly if the frame is distorted or wracked. When this occurs, the detent 28 is angled upwardly into the slot 18, making it possible for the tongue 20 to be withdrawn, thus resulting in an undesirable separation of the wall sections. Because this condition cannot be observed from outside the wall component, it often escapes the scrutiny of those responsible for assembly and quality control.

SUMMARY OF THE PRESENT INVENTION

The present invention has as its primary objective the provision of an improved means for positively and securely interlocking the ends of a wall component of the type described above. A related object of the present invention is the provision of means for visibly checking the integrity of the interlock from the exterior of the wall component.

In a preferred embodiment of the invention to be described hereinafter in greater detail, these and other objects and advantages are achieved by providing a receiving notch for retaining the inserted second tongue in its operative position underlying and parallel to the first wall. Preferably, the notch is defined in part by a third tongue blanked out of the first wall. This provides an opening through which the operatively positioned second tongue may be observed from the exterior of the wall component.

BRIEF DESCRIPTION OF THE DRAWINGS

FIG. 1 is a view in perspective of the ends of conventional wall sections prior to their being interlocked at a corner of the wall component;

FIG. 2 is a view showing the conventional wall sections after they have been interlocked;

FIG. 3 is a sectional view taken along line 3—3 of FIG. 2;

FIG. 4 is a view similar to FIG. 3 showing the second tongue bent inwardly at an acute angle relative to the second wall section;

DETAILED DESCRIPTION OF PREFERRED EMBODIMENT

Figures 5, 6:
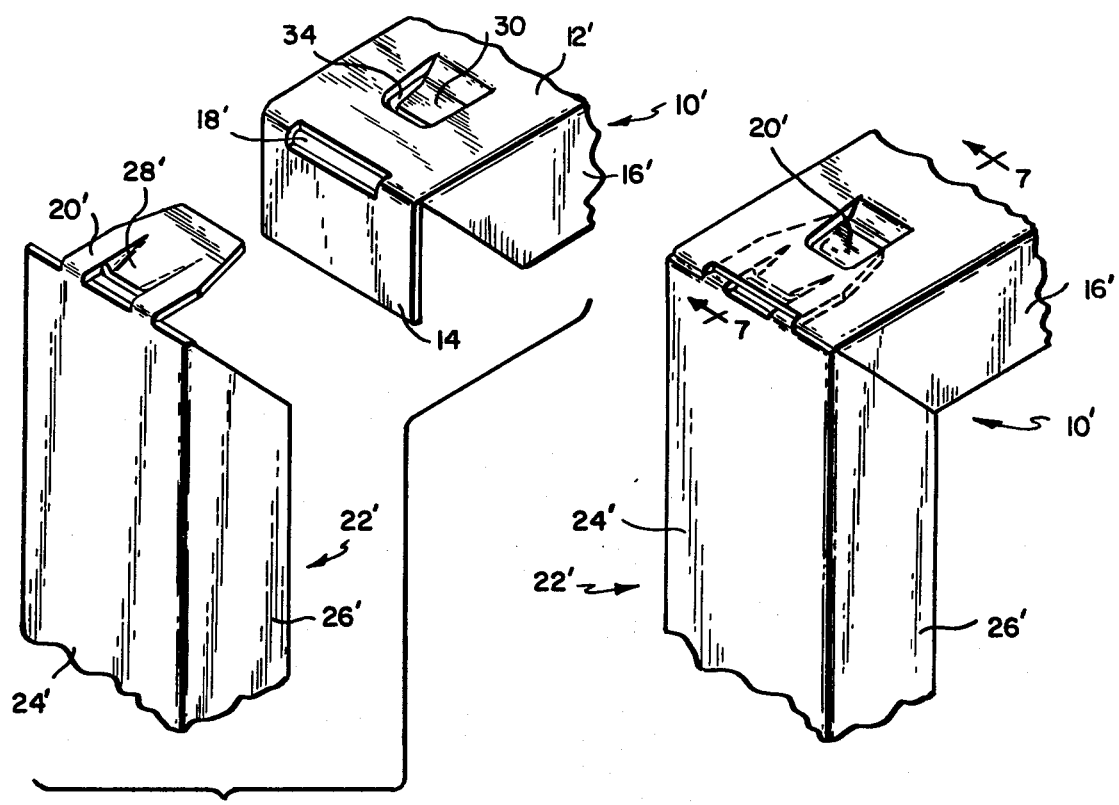
FIG. 5 is a perspective view of the ends of two separated wall sections embodying the concepts of the present invention.
FIG. 6 is a view of the wall sections of the present invention after they have been interlocked.

Referring now to FIGS. 5-8, the elements which are identical to those illustrated in FIGS. 1-4 have been designated by the same primed reference numerals.

The first wall 12' has been blanked to provide a third tongue 30 defining a notch 32 which is spaced from and in confronting relationship to the slot 18'. The tongue 30 underlies an opening 34 in the first wall 12', and has an end portion 30a parallel to the first wall. If the second tongue 20' is properly inserted through the 18' slot, as shown for example in FIGS. 6 and 7, its end enters the notch 32 where it is securely captured in the operative position between the third tongue 30 and the first wall 12'. This insures that the detent 28' is positively and permanently interlocked behind the first tongue 14. When thus operatively positioned, the second tongue 20' is visible through opening 34 from the exterior of the wall component, thereby providing those responsible for assembly and quality control with a positive check.

Figures 7, 8:
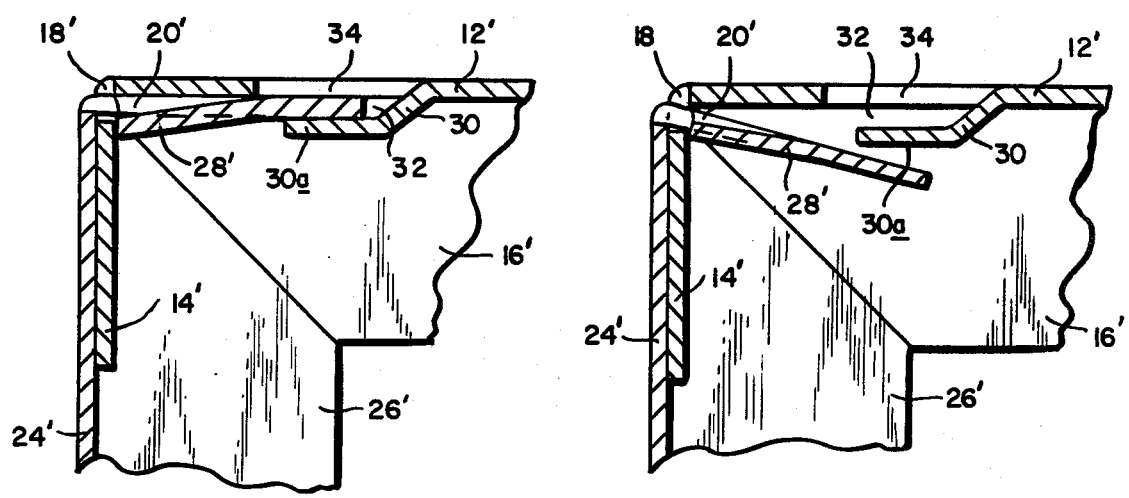
FIG. 7 is a sectional view taken along line 7—7 of FIG. 6.
FIG. 8 is a sectional view similar to FIG. 7, but again showing the second tongue bent inwardly at an acute angle relative to the second wall section.

However, as shown in FIG. 8, should it happen that the wall sections are not properly assembled, the second tongue 20' will underlie the third tongue 30, and this condition will be visible through the opening 34, thereby alerting the assembler that the components are not positively and securely interlocked. Once operatively inserted, the second tongue is firmly held between the first wall 12' and the third tongue 30, making it impossible to disrupt this condition by distorting or wracking the wall component.

We claim:

1. Apparatus for mechanically interlocking the ends of two mutually perpendicular wall sections, comprising:

first and second tongues and first and second openings on one of said wall sections, said first tongue being perpendicular to and extending inwardly from the end of said one wall section, said first opening lying at the juncture of said first tongue and said one wall section, said second tongue pointing towards said first tongue at a location underlying said second opening, said second tongue cooperating with said one wall section to define a receiving notch opening towards said first opening, a third tongue perpendicular to and extending inwardly from the other of said wall sections, said third tongue being dimensioned to pass through said first opening into said receiving notch, and a resiliently depressible detent on said third tongue facing towards said other wall section arranged to coact in mechanical engagement with said first tongue generally underlying said first opening to prevent withdrawal of said third tongue from said receiving notch through said first opening.

2. The apparatus of claim 1 wherein said second tongue has an end portion parallel to said one wall section.

3. The apparatus of claims 1 or 2 wherein the end of said third tongue is confined tightly between said second tongue and said one wall section when said third tongue is received in said receiving notch.

* * * * *